(12) United States Patent
Rufin

(10) Patent No.: US 11,089,374 B2
(45) Date of Patent: Aug. 10, 2021

(54) DIRECT NAVIGATION IN A VIDEO CLIP

(71) Applicant: Orange, Issy-les-Moulineaux (FR)

(72) Inventor: Christophe Rufin, Boulogne Billancourt (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 16/061,188

(22) PCT Filed: Nov. 29, 2016

(86) PCT No.: PCT/FR2016/053129
§ 371 (c)(1),
(2) Date: Jun. 11, 2018

(87) PCT Pub. No.: WO2017/098111
PCT Pub. Date: Jun. 15, 2017

(65) Prior Publication Data
US 2018/0367858 A1  Dec. 20, 2018

(30) Foreign Application Priority Data

Dec. 11, 2015 (FR) ...................... 1562256

(51) Int. Cl.
| | |
|---|---|
| *H04N 21/472* | (2011.01) |
| *G06F 3/0485* | (2013.01) |
| *G06F 3/0488* | (2013.01) |
| *G11B 27/10* | (2006.01) |
| *G11B 27/34* | (2006.01) |

(52) U.S. Cl.
CPC ..... *H04N 21/47217* (2013.01); *G06F 3/0485* (2013.01); *G06F 3/0488* (2013.01); *G06F 3/04883* (2013.01); *G11B 27/102* (2013.01); *G11B 27/34* (2013.01)

(58) Field of Classification Search
CPC ........................ H04N 21/47217; G06F 3/0488
See application file for complete search history.

(56) References Cited

U.S. PATENT DOCUMENTS

| | | | |
|---|---|---|---|
| 2010/0231534 A1 | 9/2010 | Chaudhri et al. | |
| 2011/0275416 A1* | 11/2011 | Chang | G06F 3/04883 455/566 |
| 2012/0096357 A1* | 4/2012 | Folgner | G11B 27/34 715/726 |
| 2012/0166950 A1 | 6/2012 | Frumar et al. | |
| 2014/0026051 A1* | 1/2014 | Roh | G06F 16/743 715/720 |

(Continued)

OTHER PUBLICATIONS

English translation of the Written Opinion dated Feb. 8, 2017, for corresponding International Application No. PCT/FR2016/053129. filed Nov. 29, 2016.

(Continued)

*Primary Examiner* — Sherrod L Keaton
(74) *Attorney, Agent, or Firm* — David D. Brush; Westman, Champlin & Koehler, P.A.

(57) ABSTRACT

A method for navigating through video content. The method includes using a graphical user interface displayed on a touch screen. The user interface includes: a video player, which can play, video content; and a banner having comprising a fixed number of images extracted from the video content. The images extend parallel to the banner in chronological order.

9 Claims, 6 Drawing Sheets

(56) References Cited

U.S. PATENT DOCUMENTS

2015/0121225 A1 4/2015 Somasundaram et al.
2016/0334980 A1* 11/2016 Persson ............... H04L 65/4069
2016/0357353 A1* 12/2016 Miura ................. G06F 3/04842

OTHER PUBLICATIONS

International Search Report dated Feb. 8, 2017, for corresponding International Application No. PCT/FR2016/053129. filed Nov. 29, 2016.
Written Opinion dated Feb. 8, 2017, for corresponding International Application No. PCT/FR2016/053129. filed Nov. 29, 2016.

* cited by examiner

DIRECT NAVIGATION IN A VIDEO CLIP

CROSS-REFERENCE TO RELATED APPLICATIONS

This Application is a Section 371 National Stage Application of International Application No. PCT/FR2016/053129, filed Nov. 29, 2016, the content of which is incorporated herein by reference in its entirety, and published as WO 2017/098111 on Jun. 15, 2017, not in English.

FIELD OF THE DISCLOSURE

The present invention is part of the field of the reproduction of video content by a touchscreen. It concerns in particular a method and a device for navigating in a video content.

This method is particularly advantageous for selecting video clips of a few seconds in video content lasting less than two minutes.

BACKGROUND OF THE DISCLOSURE

"Video content" is understood to mean any type of content capable of reproducing animated images forming a video, possibly accompanied by sound. An example of video content is an avi or mpeg file. In the remainder of the description, the terms "video content" and "video" will be used without distinction.

"Navigation in a video content" is understood to mean the possibility for a user to run through different instants of the video content, for example by initiating the video from a given instant or by bringing up an image corresponding to a given instant of the video.

"Touchscreen" is understood to mean any type of screen capable of being controlled by a movement from the user, this definition particularly covering screen control by analysis of the movements performed close, in direct or more distant proximity, to the screen. Screens using surface wave, capacitive, infrared, NFI ("Near Field Imaging") or visual movement detection (such as the Kinect, REGISTERED TRADEMARK device) technology are examples of touchscreens.

Navigation within a video reproduced by a touchscreen is habitually performed using a progress bar embedded or situated close to an area dedicated to reproduction of the video. The area dedicated to reproduction of the video is called a "video content player".

For example, it is possible to navigate in a video content reproduced (for example on the touchscreen of a tablet) by the streaming platform YouTube, REGISTERED TRADEMARK, using a progress bar situated beneath the video content player. To do this, the user can place his finger at a precise point on the progress bar, the precise point corresponding to a given instant in the video content. When he places his finger in this manner, the video content player reproduces the video from the given instant in the video content.

If it is simple and robust, this method of navigation does not provide the user with guidance to assist him in selecting the precise instant in the video that he wishes to reach, however. Indeed, this method does not offer an overall view of the video to the user. He therefore has to fumble around by selecting many points on the progress bar in order to succeed in finding a precise instant in the video. Such fumbling around is particularly problematic when the touchscreen is small and it is difficult to place a finger at a precise point on the progress bar.

To facilitate navigation, it has also been possible to suggest displaying thumbnails depicting small images extracted from a passage of the video content. There are five such thumbnails, for example, which are displayed beneath the video content player. The thumbnails thus provide the user with a quick idea of the passage covered by the thumbnails. The user can run through the whole video by scrolling through the thumbnails to select other passages. Once the appropriate thumbnail has been found following scrolling, he can initiate playback of the video from the image depicted by the thumbnail by selecting this thumbnail.

This is restricting in so far as a large number of operations is required to arrive at the relevant passage. Moreover, such a method multiplies the number of possible inputs (image selection; image scrolling; video playback, etc.) to be integrated into the touchscreen, which is problematic from the point of view of the size of the touchscreen (in the case of small screens) and increases the complexity of the navigation software (increased computation resources and power consumption).

SUMMARY

The present invention improves the situation.

To this end, a first aspect of the invention concerns a method for navigating in a video content, the navigation being performed from a graphical user interface displayed by a touchscreen, the user interface comprising:
  a video player capable of reproducing the video content;
  a banner comprising a fixed plurality of images extracted from the video content, the images extending in a direction parallel to the banner and in a chronological order;
  the method having the steps of:
  detection of a touch of the touchscreen by the user on the banner, the touch being of slide type extending in the direction parallel to the banner;
  on detection of the touch, successive display, by the video player, of images respectively corresponding to the images of the banner that are successively touched during the slide movement;
  on detection of an interruption to the touch, playback of the video content by the video player from a last image displayed by the video player, corresponding to a last image touched during the slide movement.

"Graphical user interface" is understood to mean any man/machine dialog device in which the objects to be manipulated are drawn in the form of pictograms on the screen, so that the user can use them by imitating the physical manipulation of these objects using a pointing device (fingers, stylus or even mouse, for example). In particular, the graphical user interface can comprise a display of various components such as the video player and the banner, some components, or some areas of components, being selectable by the user.

"Banner comprising a fixed plurality of images extracted from the video content" is understood to mean any type of part of the graphical user interface that is capable of having at least one image, for example of reduced size. In particular, the fact that the banner comprises only a fixed plurality of images means, in this case, that it is not possible for the user to modify the images present in the banner: he cannot scroll through these images within the banner to run through the video content. The plurality of images is fixed in relation to the video content in which the user wishes to navigate, the images included on the banner being different when the video content changes.

In this case, "direction parallel to the banner" is understood to mean a direction that follows a general movement of the banner. The term "parallel" can therefore be considered, in this case, to be equivalent to "tangential", in particular in situations in which the banner has a curve shape (banner with a circular, elliptical, etc. shape).

"Slide-type touch" is understood to mean any type of interaction, contact or local, by the user with the screen comprising a displacement movement. The interaction by the user with the screen can be performed by virtue of physical or local contact, for example, between a member of the user (at least one finger, nose, chin, an arm, etc.) or any type of stylus held by the user, for example, and the touchscreen. This type of touch is sometimes called "slide input" or "sliding input".

"Video content player" is understood to mean a portion of the graphical user interface that is capable of reproducing the video content, typically by displaying the image succession constituting the video.

As the plurality of images included in the banner is fixed, the user does not have to scroll through the images of the banner in order to run through the video content. So that a sufficient number of images is present in the banner and these images thus provide a faithful depiction of the whole video content, it is necessary for these images to be sufficiently small. This reduction in the size of the images is accomplished in this case without loss of clarity for the user in so far as there is provision for successive display, by the video player, of the images respectively corresponding to the images of the banner that are successively touched during the slide movement.

The user can therefore directly and easily access a portion of the video of interest to him, without having to fumble around on a progress bar. He moreover does not have to scroll through images in the banner to arrive at the portion of the video content of interest to him, even if the touchscreen he has is small.

Moreover, the fact that the playback of the video is triggered as soon as an interruption to the touch is detected reduces the complexity of navigation within the video content again and reduces the time needed by the user to access a relevant content to a few seconds. Indeed, a single gesture suffices to initiate the video at the point that the user precisely requires. The reduction in the time and the interactions with the touchscreen that are usually required to initiate the video at a precise moment also has the effect of reducing the computation and battery resources needed for such navigation.

"Interruption to the touch" is understood to mean any type of interruption to the slide movement. As explained in detail below, this may be simple stoppage or slowing of the movement such as physical separation between the user and the touchscreen.

In one embodiment, the slide-type touch is detected if it extends in a direction following the chronological order of the images included in the banner. The gesture used to run through the video content is therefore instinctive, which reduces the time that the user needs in order to get a grip on the navigation method according to the first aspect of the invention. In one embodiment, the slide-type touch is detected if it extends in a direction following the chronological or reverse chronological order of the images included in the banner.

In another embodiment, the images of the banner extend in a chronological order from left to right. In this case again, the orientation of the images in a chronological order from left to right is instinctive. Another orientation can also be envisaged, particularly in regions in which it is more instinctive for the users to depict a chronological order from right to left.

In one embodiment, the video content has a duration less than or equal to two minutes. The present invention is indeed particularly advantageous in the case of short videos. Indeed, the shorter the video, the less the user will have difficulty finding his way in the video from a small number of images extracted from the video. Thus, the number of images to include in the banner may be smaller in the case of short videos than in the case of longer videos. The fact is that a small number of images to include in the banner improves legibility of the banner and again simplifies use of the method according to the invention.

In one embodiment, the size of the images included on the banner is defined so that said images can be displayed side by side in the banner. An overview of the video content is thus guaranteed for the user in so far as the clarity of the images of the banner is ensured (no image overlap being possible).

In another embodiment, the banner has at least one of the following features:
  the banner has a rectangular shape;
  the banner has a square shape;
  the banner has a circular shape;
  the banner is situated beneath the video content player;
  the banner is situated on the video content player;
  the banner is situated to the right of the video content player;
  the banner is situated to the left of the video content player;
  the banner is embedded in the video content player;
  the banner is immediately next to the video content player.

The technical and geometric specifics of the touchscreen can therefore be taken into consideration for choosing the shape and location of the banner within the graphical user interface. Thus, a banner of rectangular shape is suited to a rectangular screen, for example in 16/9 format, while a circular banner is more suited to a square screen. In the same way, embedding the banner in the player is particularly relevant when the size constraints of the screen are high (small screen), for example.

In one embodiment, the navigation is performed by a user of an electronic device, the touchscreen being included on the electronic device. In this embodiment, the interruption to the touch corresponds to separation between the touchscreen and the user. "Separation between the touchscreen and the user" is understood to mean any physical separation between the touchscreen and the user (at least one finger of the user, stylus held by the user, etc.). The action by the user to implement the navigation method according to the present embodiment thus comes down to a simple gesture. The interactions between the user and the screen are thus reduced to the minimum, the effect of which is to reduce the power consumption imposed on the electronic device by the touchscreen to the maximum.

As a variant, the interruption to the touch corresponds to stoppage of the sliding. This variant provides a degree of additional freedom to control the navigation in the video content. Indeed, if the stoppage of the sliding corresponds to the initiation of the video, it is possible to provide for other functions to be associated with a physical separation between the user and the touchscreen (video pause, return to the beginning, etc.).

In another embodiment, the method moreover has the step of, on detection of a confirmation of interruption to the touch, extraction of a clip of the video content, the clip starting with the last image displayed by the video player and finishing with the end of the video content. As a variant, the method moreover has the step of on detection of a confirmation of interruption to the touch, extraction of a clip of the video content, the clip starting with the last image displayed by the video player and having a predetermined duration.

The "confirmation of interruption to the touch" corresponds to any type of interaction between the user and the touchscreen that has the effect of confirming the interruption to the touch. As explained in detail below, this confirmation of interruption can consist, by way of example, in lifting the finger from the touchscreen (confirmation) after having stopped the slide movement (interruption to touch).

Two gestures (sliding and confirmation of stoppage of sliding) are therefore sufficient to select then extract a portion of a video. When the clip finishes at the end of the video, the user is certain that the portion of the video of interest to him will be included in the clip. If the duration of the clip is fixed, the user defines the clip more precisely.

The implementation of such a method is particularly suited to smartphone use. Indeed, these devices, which frequently incorporate video playback multimedia functions, have constraints in the size of the screen and in consumption of computation resources and power that make a simple and not very resource-hungry method for selecting and extracting a portion of a video content very relevant. Moreover, smartphones incorporate sharing functions, for example on social networks, which make heavy demands on software building blocks for playing back/selecting/extracting video content.

A second aspect of the invention concerns a computer program having instructions for implementing the method according to the first aspect of the invention when these instructions are executed by a processor.

A third aspect of the invention concerns an electronic device capable of playing back a video content, the device having:
- a touchscreen;
- a microcontroller designed to perform the following steps:
  - display, on the touchscreen, of a graphical user interface comprising a video player capable of reproducing the video content and a banner comprising a fixed plurality of images extracted from the video content, the images extending in a direction parallel to the banner and in a chronological order;
  - detection of a touch of the touchscreen by the user on the banner, the touch being of slide type extending in the direction parallel to the banner;
  - on detection of the touch, successive display, by the video player, of images respectively corresponding to the images of the banner that are successively touched during the slide movement;
  - on detection of an interruption to the touch, playback of the video content by the video player from a last image displayed by the video player, corresponding to a last image touched during the slide movement.

BRIEF DESCRIPTION OF THE DRAWINGS

Other features and advantages of the invention will emerge on examining the detailed description below and the appended drawings, in which.

DETAILED DESCRIPTION OF ILLUSTRATIVE EMBODIMENTS

The invention is described below in its, nonlimiting, application to an electronic device of smartphone type comprising a touchscreen controlled by at least one finger of a user. Other applications such as control of the touchscreen of a tablet using a stylus or else control by detection of movements by a gaming console are also possible.

Figure 1:
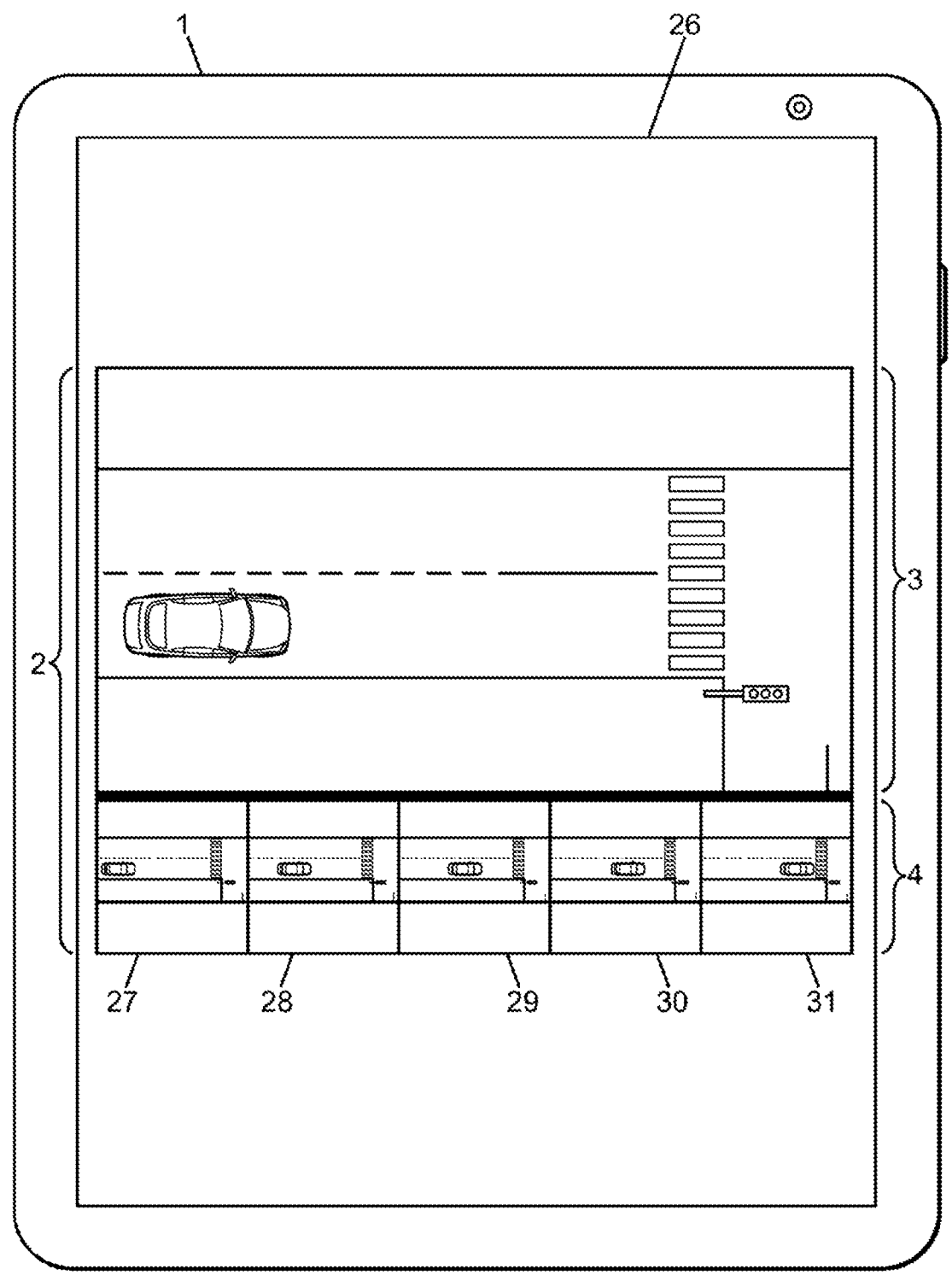
FIG. 1 illustrates a use context of the invention, according to an embodiment.

FIG. 1 depicts an electronic device 1, the invention is described below for an electronic device of smartphone type, comprising a touchscreen 26 displaying a graphical user interface 2. The display of the user interface can be obtained when the user initiates an application dedicated to playing back a video. Such an application could be incorporated into another application using known software tools (plugins, API, etc.). This application can also be called by another application (instruction to initiate the video playback application by an application specific to a social network, for example).

In one embodiment, the application is initiated on reception (and possibly confirmation by the user) of a notification message received from a connected object. For example, on detection of an instruction from the user of a TV decoder, the decoder can select a clip, called "video content" or "video" in the remainder of the description, from the video signal considered by the user (typically no more than 2 min. of the signal broadcast by a television channel) and transmit it (possibly via the termination box of an operator) to the smartphone of the user. Once the video content has been received by the smartphone, the smartphone can inform the user by means of a notification. On selection of the notification, the graphical user interface 2 described below can be displayed to implement the method according to the first aspect of the invention, described in detail below.

The graphical user interface 2 comprises at least two portions, a video content player 3 and a banner 4. The video content player 3 is capable of displaying playback of the video content. The sound signal linked to the video content can be broadcast simultaneously with the playback of the video content. As a variant, no sound signal is broadcast. An example of video in which a car 5 is moving on a road is given for the remainder of the description. It is accepted, in the remainder of the description, that the car is moving from left to right and ends up stopping at crossroads lights at an intersection.

As the banner 4 comprises a fixed plurality of images (27; 28; 29; 30; 31) extracted from the video content, the images extending in a direction parallel to the banner and in a chronological order. In particular, in one embodiment, the images of the banner extend in a chronological order from left to right. Moreover, in another embodiment, the size of the images included on the banner is defined so that said images can be displayed side by side in the banner. As a variant, the images can be superposed, at least in part, on one another so as to be able to depict more images in a smaller space.

The banner 4 can have various shapes and be situated at various points on the graphical user interface, as described below with reference to FIGS. 2A to 2C.

Figure 2A:
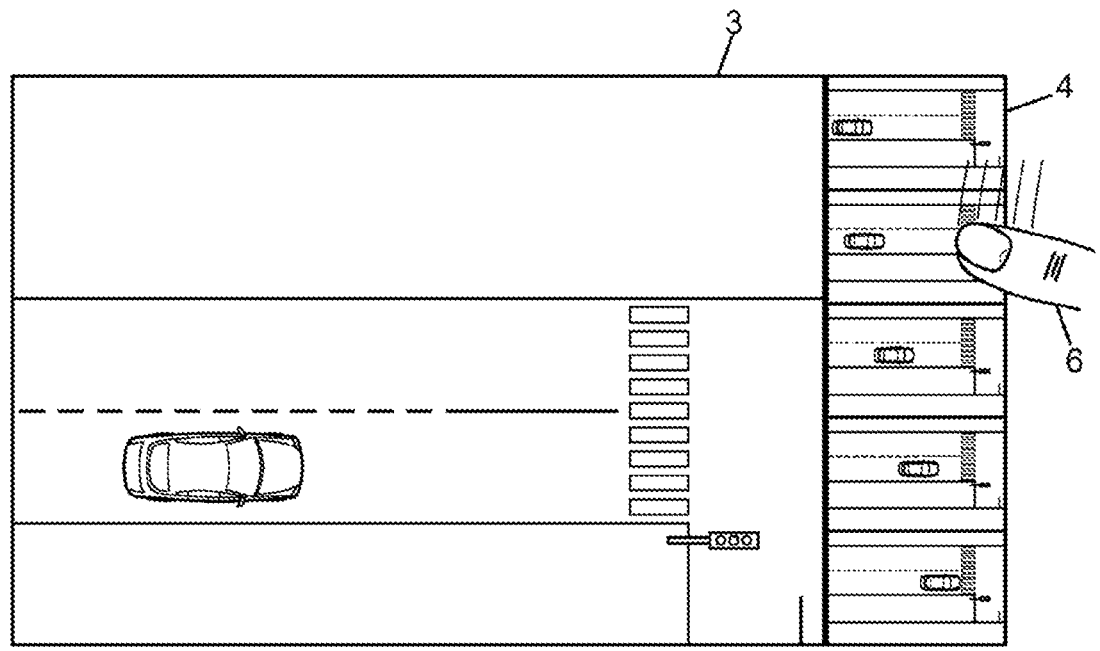
FIGS. 2A to 2C illustrate banners according to embodiments of the invention.

FIG. 2A illustrates a graphical user interface in which the banner 4 is immediately on the right of the video player 3. The slide-type touch, performed by a finger 6 of the user, and described below in detail with reference to FIGS. 3A and 3B, can in this case run through the banner from top to bottom, for example following the chronological order of the images of the banner. Indeed, the images of the banner extend in a chronological order from top to bottom in FIG. 2A.

Figure 2B:
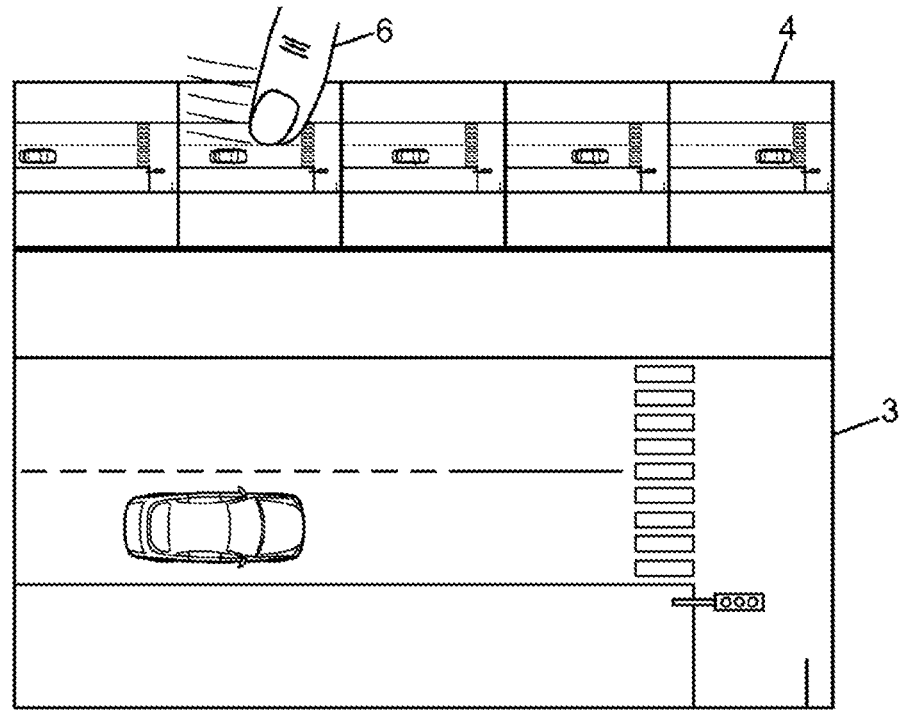

FIG. 2B illustrates the case in which the banner 4 is immediately at the top of the video player 3. In this situation, the slide-type touch can also be performed from left to right, following a chronological order of the images.

Figure 2C:
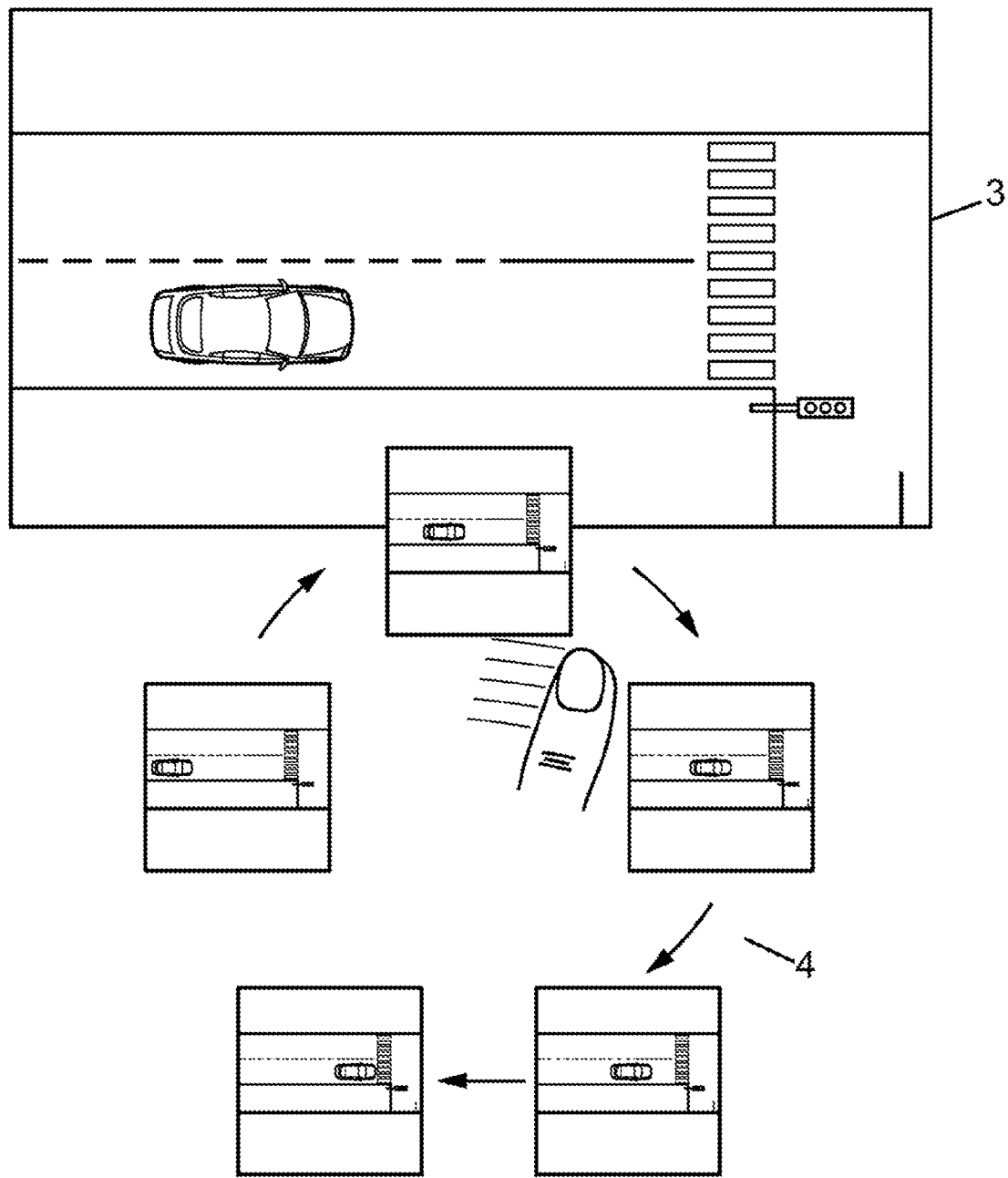

FIG. 2C, for its part, depicts the case in which the banner 4 is of circular shape and is at least partly embedded in the video player 3. The slide-type touch can in this case run through the banner in circular fashion, for example clockwise. The images of the banner can in this case also extend in a chronological order clockwise. As indicated above, in this case, the slide-type touch extending in a direction parallel to the banner is understood as a touch following the chronological order of the banner, that is to say in this case a circular movement clockwise. Thus, in this case, it is also possible to refer to a slide-type touch extending in a direction tangential to the banner.

Figure 3A:
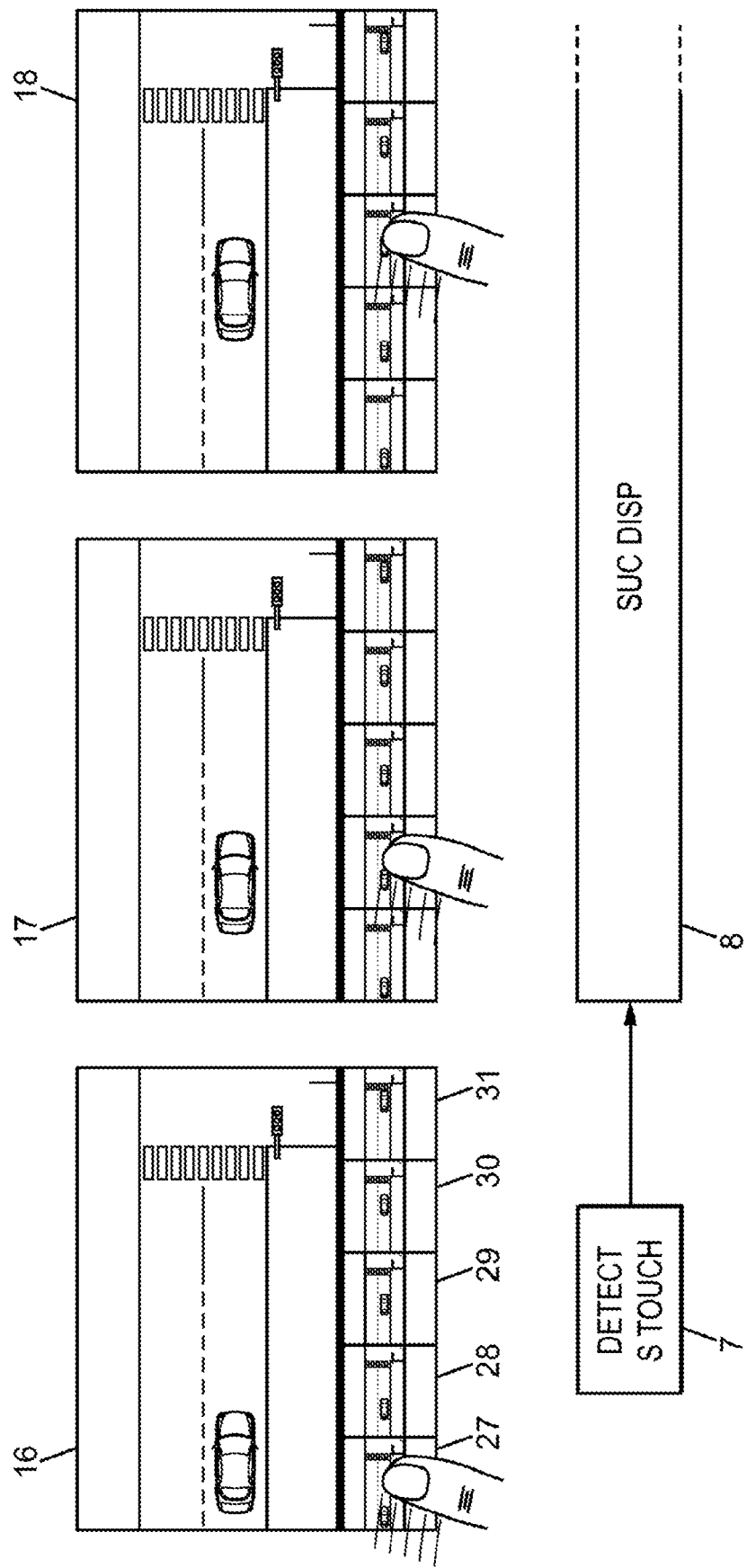
FIGS. 3A and 3B are diagrams illustrating the steps of a method according to an embodiment of the invention.
Figure 3B:
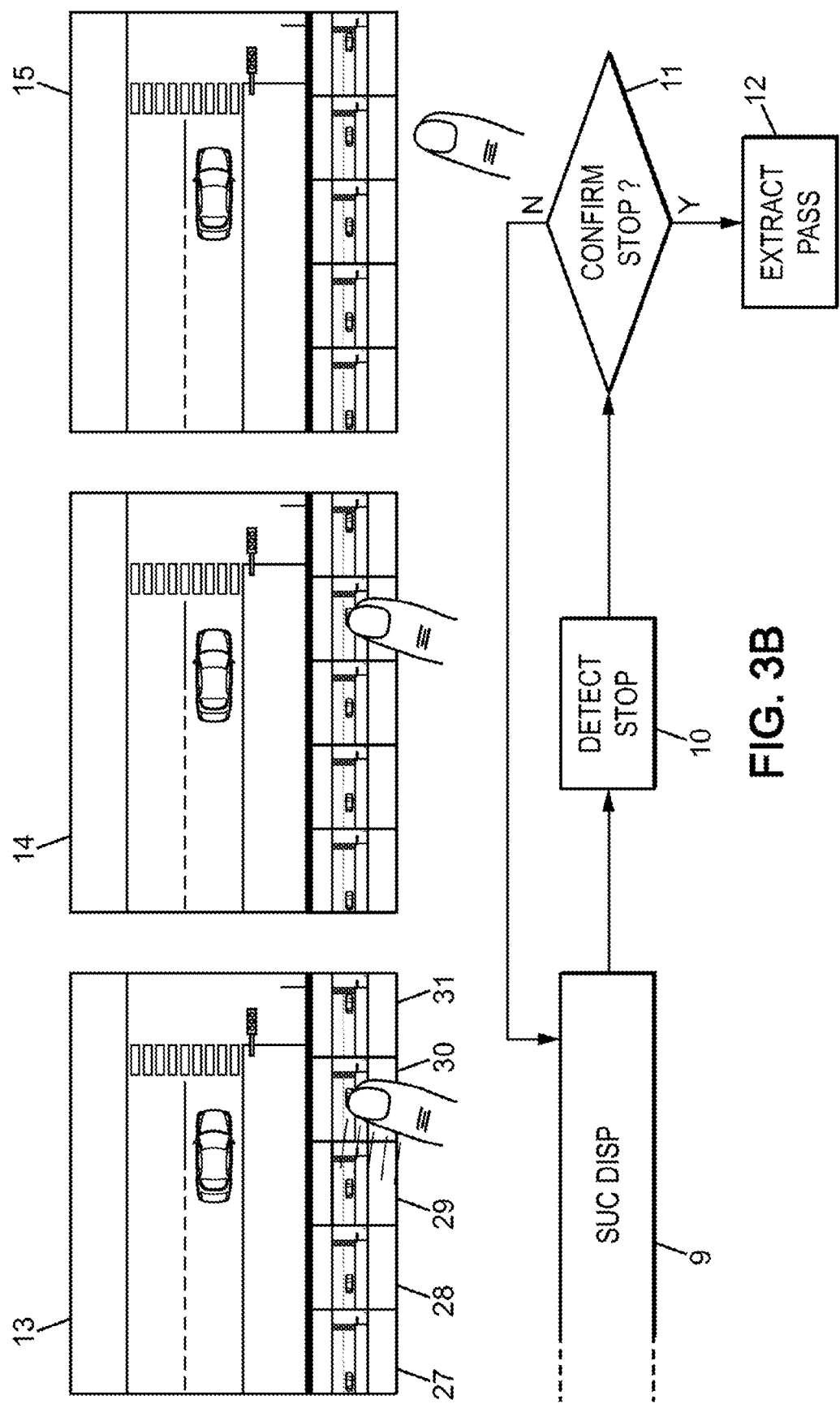

FIGS. 3A and 3B illustrate the method for navigating in the video content.

As mentioned above, the method can, for example, be implemented when the user receives a notification informing him that a video content extracted from a TV decoder is available on his smartphone. When the user selects (clicks) on the notification, he can be redirected to the graphical user interface.

As presented by the illustration 16, the user bringing up the graphical user interface begins to perform a slide-type touch on the banner 4, in a direction parallel to the banner (the banner in this case being of rectangular shape), in the chronological direction of the images of the banner (in this case from left to right) using his finger 6. This slide-type touch is then detected in a step 7 by a microcontroller, described below with reference to FIG. 4. The mechanisms used in this detection are known to a person skilled in the art, the duration and number of user inputs (input points detected by the touchscreen) used for the detection being able to be very low, in particular. Moreover, the detection can have an acceptable error rate for dealing with cases in which the finger of the user deviates from the direction for which the slide-type touch must be detected.

Once the slide-type touch has been detected, successive display, by the video player, of images respectively corresponding to the images of the banner that are successively touched during the slide movement is provided for in step 8. This is represented by illustrations 17 to 13. Indeed, as the finger 6 of the user moves on the banner, the images displayed by the video player correspond to the images touched by the finger on the banner. For example, in the illustration 18, the finger selects the image 29 of the banner, where the car is situated a little after the middle of the image. This image is then displayed by the video player so that the user is able to correctly bring up this image in the course of his slide-type touch movement.

It is stated in this case that detection step 8, like successive display step 9, can be performed for a slide-type touch extending following the chronological order of the images but also for a slide-type touch extending following any type of order other than chronological. A slide-type touch extending in a reverse chronological order is possible, for example, the images displayed by the video player still respectively corresponding to the images touched by the finger of the user. In the case of the circular banner, the touch can also pass from a first image of the banner to a second image of the banner even though other images, which are inserted from a chronological point of view, are situated between the first and second images (passage through the inside of the circle, via a diameter of the circle, for example). Combinations of various touches are also possible, in so far as there is provision for successive display, by the video player, of images respectively corresponding to the images of the banner that are successively touched during the slide movement.

Next, a step of detection of an interruption to the touch, comprising the substeps of detection of stoppage of the sliding 10 and of confirmation of interruption to the touch 11, is implemented.

In substep 10, the microcontroller detects that the user stops his slide movement, without, however, lifting his finger from the touchscreen. Thus, in the illustration 14, the finger is no longer moving and is stopped over the image 30.

In substep 11, a test is performed to check that the user actually wishes to notify the smartphone of an interruption to the slide-type touch. This confirmation can take the form of lifting of the finger 6 (physical separation between the touchscreen and the user) or any other type of interaction by the user with the smartphone (confirmation by voice, by clicking on a popup window, etc.). A confirmation request can be displayed on the screen by the smartphone, for example by means of the display of a notification saying "if you wish to confirm that the slide-type touch is stopped, you can simply lift your finger from the screen".

If the interruption to the touch is not confirmed, the method can resume in step 9 and the user can continue his slide-type touch to resume successive display of the images by the video player, for example in another direction (reverse chronological direction to return to a previously touched image).

If the interruption to the touch is confirmed, playback of the video content by the video player from the last image (image 30 in this case) displayed by the video player, corresponding to a last image (image 30 in this case) touched during the slide movement, is implemented in step 12.

On detection of a confirmation of the interruption to the touch, several actions can be implemented in step 12. In one embodiment, the video content is then simply played by the player from the last image (image 30 in this case) displayed by this player. In another embodiment, extraction of a clip of the video content is performed. The clip can then begin with the last image displayed by the video player (image 30 in this case) and finish with the end of the video content. As a variant, the clip can begin with the last image displayed by the video player and have a predetermined duration (for example 15 seconds). This clip can then be shared, for example, via a social network of via a plugin allowing the clip to be sent by email. Other actions may be envisaged in step 12, such as, for example, the display of metadata relating to the video, the opening of a window for controlling the video (playback, fastforward, next chapter, etc. functions), etc.

As a variant, step 12 of playback/extraction/other can be implemented as soon as stoppage of the slide-type touch is detected, without a confirmation needing to be used.

Figure 4:
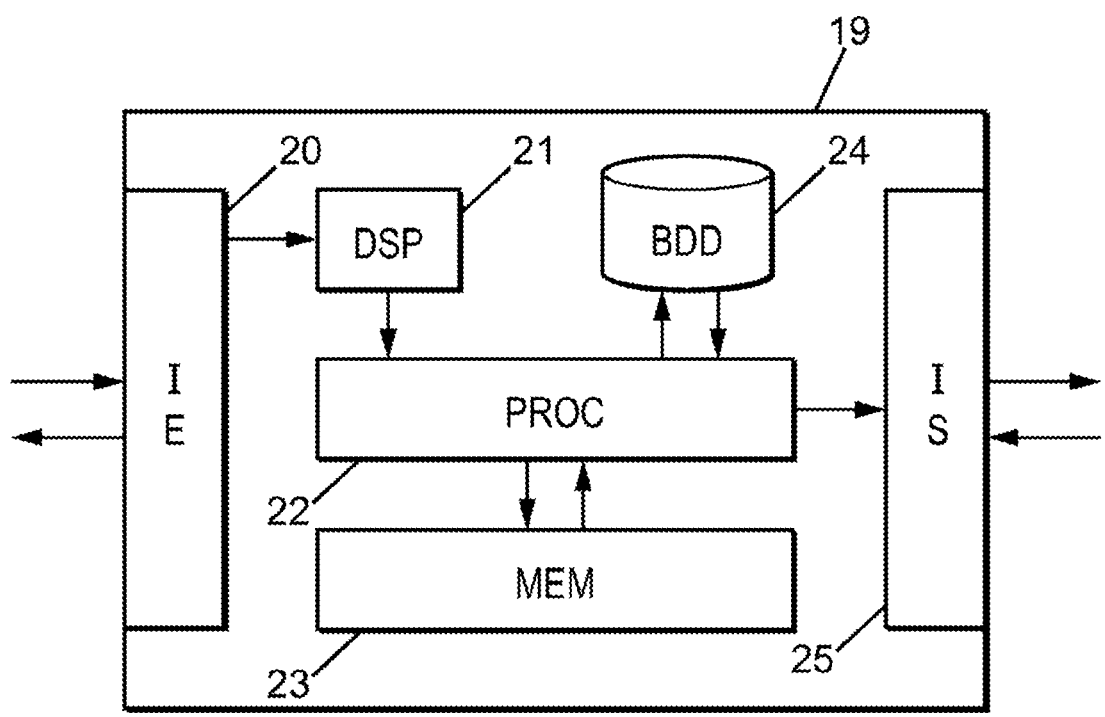
FIG. 4 illustrates a microcontroller, according to an embodiment of the invention.

The detail of a microcontroller 19, included in the electronic device 1, in particular, from which the steps are implemented the steps of the method described with reference to FIGS. 3A and 3B, in particular, is described in this case with reference to FIG. 4.

This microcontroller 19 can take the form of a box comprising printed circuits, of any type of computer or of any type of subportion of the electronic device 1.

The microcontroller 19 comprises a random access memory 23 for storing instructions for a processor 22 to implement the steps of the method described with reference to FIGS. 3A and 3B, in particular. The device also has a mass memory 24 for storing data intended to be preserved after implementation of the method.

The microcontroller 19 can moreover have a digital signal processor (DSP) 21. This DSP 21 receives, for example, the video to format, demodulate and amplify, in a manner known per se, this video.

The microcontroller 19 also has an input interface 20 for receiving data such as the video, the input signals received from the touchscreen, operating parameters, etc. The microcontroller 19 also has an output interface 25 particularly for transmitting display data to the touchscreen.

The present invention is not limited to the embodiments described above by way of example; it extends to other variants.

Thus, an embodiment in which the slide-type touch being performed by a finger of the user has been described above. This slide-type touch can also be performed from several fingers, a stylus or any type of pointing device on the touchscreen. Moreover, the slide-type touch can be detected and processed by the method described above for a movement performed close to the touchscreen. The invention is indeed directly applicable to movement detection techniques (for example using a plurality of cameras) in which the slide-type touch can typically correspond to a rectilinear movement of a hand and confirmation by a hand withdrawal action.

Moreover, an embodiment in which the slide-type touch corresponded to a rectilinear movement has been described above. The slide-type touch can, however, correspond to any type of movement and thus comprise undulations or broken lines, for example.

Although the present disclosure has been described with reference to one or more examples, workers skilled in the art will recognize that changes may be made in form and detail without departing from the scope of the disclosure and/or the appended claims.

The invention claimed is:

1. A method for navigating in a video content, the navigation being performed from a graphical user interface displayed by a touchscreen of an electronic device, the user interface comprising:
    a video player capable of reproducing the video content;
    a banner comprising a fixed plurality of images extracted from the video content, the images extending in a direction parallel to the banner and in a chronological order;
    the method comprising the following acts performed by the device in order to extract a clip including a starting image,
        detecting a touch of the touchscreen by the user on the banner, the touch being of slide type extending in the direction parallel to the banner;
        on detection of the touch, successive displaying, by the video player, of images respectively corresponding to the images of the banner that are successively touched during the slide movement;
        on detection of an interruption of the slide movement, the electronic device checks if the touch is maintained on the touchscreen during the interruption, if yes playing back the video content by the video player from a last image displayed by the video player, corresponding to a last image touched during the slide movement;
        on detection of a confirmation of the interruption to the touch by lifting the touch, extracting the clip including a plurality of images of the video content, the clip starting with the last image displayed by the video player and having a predetermined duration; and
        performing at least one of providing the extracted clip to the video player where the extracted clip is read and displayed, or providing a share functionality capable of sharing the extracted clip.

2. The method as claimed in claim 1, in which the slide-type touch is detected if it extends in a direction following the chronological order of the images included in the banner.

3. The method as claimed in claim 1, in which the images of the banner extend in a chronological order from left to right.

4. The method as claimed in claim 1, in which the video content has a duration less than or equal to two minutes.

5. The method as claimed in claim 1, in which the size of the images included on the banner is defined so that said images can be displayed side by side in the banner.

6. The method as claimed in claim 1, in which the banner has at least one of the following features:
    the banner has a rectangular shape;
    the banner has a square shape;
    the banner has a circular shape;
    the banner is situated beneath the video content player;
    the banner is situated on the video content player;
    the banner is situated to the right of the video content player;
    the banner is situated to the left of the video content player;
    the banner is embedded in the video content player;
    the banner is immediately next to the video content player.

7. The method as claimed in claim 1, in which the clip starts with the last image displayed by the video player and finishes with the end of the video content.

8. A non-transitory computer-readable medium comprising a computer program stored thereon having instructions for implementing a method for navigating in a video content, when these instructions are executed by a processor of an electronic device, the navigation being performed from a graphical user interface displayed by a touchscreen of the electronic device, the user interface comprising:
    a video player capable of reproducing the video content;
    a banner comprising a fixed plurality of images extracted from the video content, the images extending in a direction parallel to the banner and in a chronological order;
    the method comprising the following acts in order to extract a clip including a starting image:
        detecting a touch of the touchscreen by the user on the banner, the touch being of slide type extending in the direction parallel to the banner;
        on detection of the touch, successive displaying, by the video player, of images respectively corresponding to the images of the banner that are successively touched during the slide movement;
        on detection of an interruption of the slide movement, the electronic device checks if the touch is maintained on the touchscreen during the interruption, if yes playing back the video content by the video player from a last image displayed by the video player, corresponding to a last image touched during the slide movement;

on detection of a confirmation of the interruption to the touch by lifting the touch, extracting a clip including a plurality of images of the video content, the clip starting with the last image displayed by the video player and having a predetermined duration; and performing at least one of providing the extracted clip to the video player where the extracted clip is read and displayed, or providing a share functionality capable of sharing the extracted clip.

9. An electronic device capable of playing back a video content, the device comprising:

a touchscreen;

a microcontroller configured to perform the following acts in order to extract a clip including a starting image:

displaying, on the touchscreen, a graphical user interface comprising a video player capable of reproducing the video content and a banner comprising a fixed plurality of images extracted from the video content, the images extending in a direction parallel to the banner and in a chronological order;

detecting a touch of the touchscreen by the user on the banner, the touch being of slide type extending in the direction parallel to the banner;

on detection of the touch, successively displaying, by the video player, images respectively corresponding to the images of the banner that are successively touched during the slide movement;

on detection of an interruption of the slide movement, the microcontroller checks if the touch is maintained on the touchscreen during the interruption, if yes playing back the video content by the video player from a last image displayed by the video player, corresponding to a last image touched during the slide movement;

on detection of a confirmation of the interruption to the touch by lifting the touch, extracting the clip including a plurality of images of the video content, the clip starting with the last image displayed by the video player and having a predetermined duration; and performing at least one of providing the extracted clip to the video player where the extracted clip is read and displayed, or providing a share functionality capable of sharing the extracted clip.

* * * * *